United States Patent [19]

Marston

[11] Patent Number: 5,345,439
[45] Date of Patent: Sep. 6, 1994

[54] MULTI PURPOSE DIGITAL SIGNAL REGENERATIVE PROCESSING APPARATUS

[75] Inventor: Paul C. Marston, Hertfordshire, Great Britain

[73] Assignee: British Aerospace Space Systems Limited, Stevenage, England

[21] Appl. No.: 51,733

[22] Filed: Apr. 23, 1993

[30] Foreign Application Priority Data

Apr. 25, 1992 [GB] United Kingdom ............... 9209027

[51] Int. Cl.⁵ ............................................. H04J 13/00
[52] U.S. Cl. ........................................ 370/18; 370/50; 370/69.1; 370/95.3
[58] Field of Search ................ 370/18, 50, 57, 69.1, 370/75, 76, 124, 95.3; 455/12.1; 375/1; 380/33, 34

[56] References Cited

U.S. PATENT DOCUMENTS

| | | | |
|---|---|---|---|
| 4,688,210 | 8/1987 | Eizenhofer et al. | 370/18 |
| 4,799,252 | 1/1989 | Eizenhoffer et al. | 370/50 |
| 4,905,221 | 2/1990 | Ichiyoshi | 370/18 |
| 5,191,576 | 3/1993 | Pommier et al. | 370/18 |

*Primary Examiner*—Douglas W. Olms
*Assistant Examiner*—Melvin Marcelo
*Attorney, Agent, or Firm*—Cushman, Darby & Cushman

[57] ABSTRACT

A multi purpose digital signal regenerative processing apparatus (1) has three modulation sub-systems (2, 3 and 4) in parallel. Each sub-system is selectively selectable to enable a plurality of users to access, independently of one another, a sub-band of a frequency band in individually selectable access modes and modulation formats. The first sub-system (1) is operable in TDM format, the second (3) is operable in FDM or OFDM format and the third sub-system (4) is operable in CDM format.

8 Claims, 1 Drawing Sheet

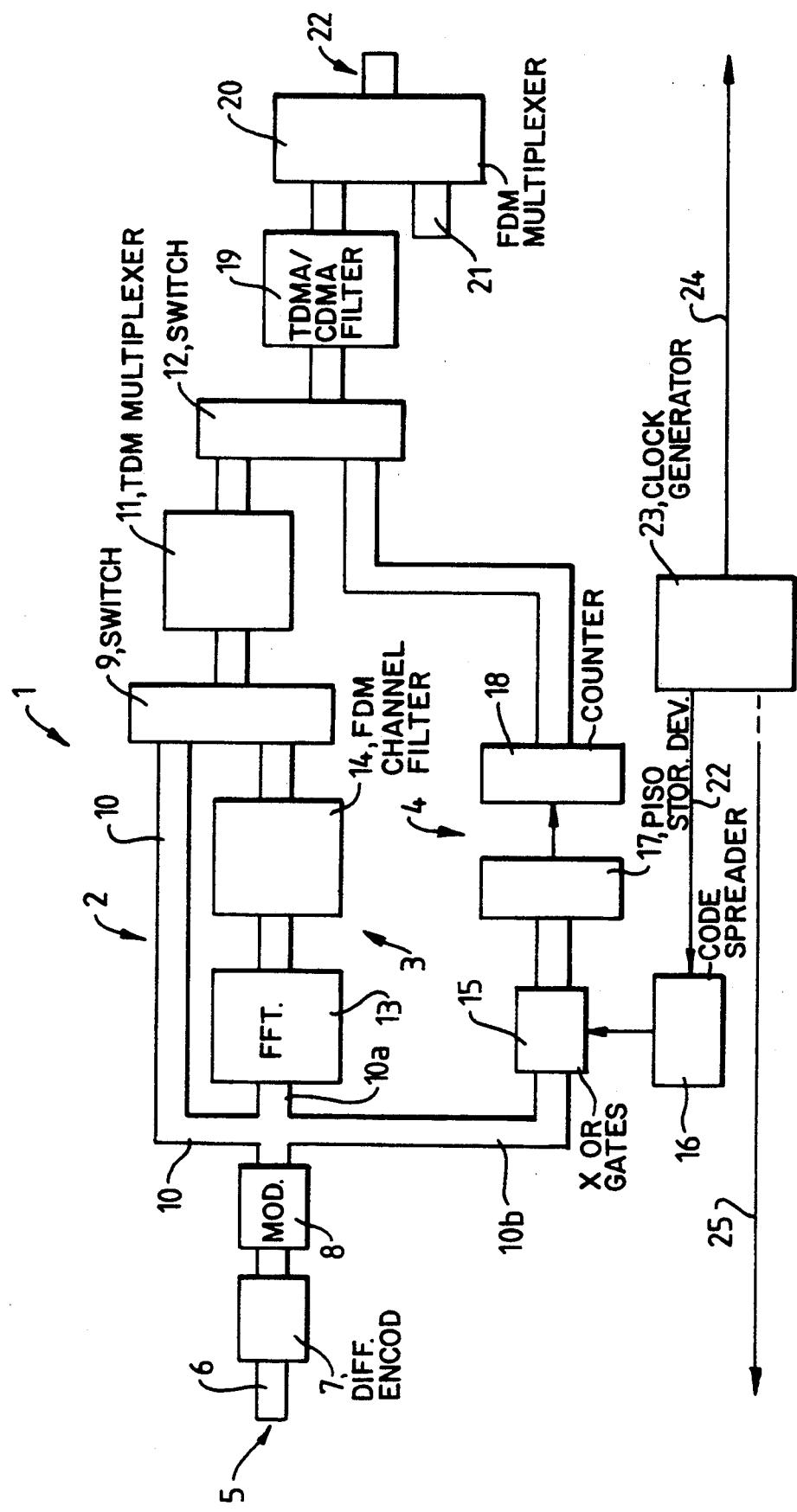

MULTI PURPOSE DIGITAL SIGNAL REGENERATIVE PROCESSING APPARATUS

BACKGROUND OF THE INVENTION

1. Field of the Invention

This invention relates to a multi purpose digital signal regenerative processing apparatus, particularly, but not exclusively, suitable for use on a satellite.

2. Description of the Art

Conventional satellite on board processors are dedicated to one particular user and one particular access mode and modulation format. This is a very inflexible system which cannot be reprogrammed if the original access mode breaks down or is superseded and is wasteful of the frequency band availability in that only a small number of potential users can be accommodated.

There is thus a need for a more flexible system which can allow different groups of users to use their share of the frequency band with different selectable access modes and modulation formats.

SUMMARY OF THE INVENTION

According to a first aspect of the present invention there is provided a multi purpose digital signal regenerative processing apparatus, having three modulation sub-systems in parallel, each selectively selectable to enable a plurality of users to access, independently of one another, a sub-band of a frequency band in individually selectable access modes and modulation formats, a first of which modulation sub-systems is configured for access and operation in TDM (Time Division Multiplex) format, a second of which modulation sub-systems is configured for access and operation in FDM (Frequency Division Multiplex) or OFDM (Orthogonal Frequency Division Multiplex) format, and a third of which modulation sub-systems is configured for access and operation in CDM (Code Division Multiplex) format.

Thus apparatus according to the first aspect of the present invention allows the frequency band to be divided into sub-bands with the access and modulation technique employed for each sub-band being selectable independently of each other.

Preferably the apparatus includes a plurality of differential encoders each having an input connectable to an associated data line in a parallel data bus, with the number of said differential encoders being equivalent to the number of data lines and with the number of data lines being equivalent to the number of users, one data line being associated with each user, and a plurality of offset modulators each connected to the output of the associated differential encoder and operable to map a data stream received from the associated differential encoder into symbols in quadrature modulation space, apply an arbitrary time shift to the quadrature modulation axes, and generate a complex digital output signal.

Conveniently the first modulation sub-system includes a first switch whose input side is connected via a digital bus to the modulators, a TDM multiplexer connected to the output side of the first switch and a second switch connected to the output side of the TDM multiplexer.

Advantageously the second modulation sub-system includes an FFT (Fast Fourier Transform) device whose input side is connected via the digital bus to the modulators and which is operable to transform digital signals received from individual modulators into an FDM multiplex group signal, and an FDM channel filter operable to receive and filter the FDM multiplex group signals and provide an output to the first switch compatible with the output received by the first switch from the first modulation sub-system, which FDM channel filter is programmable to allow the bandwidth occupancy of channels of the second modulation sub-system to be selectable, and which first switch is selectively operable to connect the second modulation sub-system to the TDM multiplexer of the first modulation sub-system.

Preferably the third modulation sub-system includes a bank of XOR (Exclusive OR Function) gates for receiving from the modulators via the digital bus and spreading a modulated signal, a PISO (Parallel In-Serial Out) digital storage device and a counter operable together to receive spread signals from the XOR gates, multiplex them together and convert them into complex multi-level digital signals for passage to the input side of the second switch which is selectively operable to connect the third modulation sub-system, first modulation sub-system or combined first and second modulation sub-systems to the output side thereof.

Conveniently the third modulation sub-system includes means for applying a spreading code to one gate of the bank of XOR gates, which codes are programmable separately for each user.

Advantageously the apparatus includes a TDMA/CDMA (Time Division Multiple Access/Code Division Multiple Access) filter for receiving a sequence of time sample signals from the output side of the second switch and isolating the sub-bands from each other, which filter is selectively programmable in shape for use with the first modulation sub-system, and an FDM multiplexer for receiving the output from the filter, multiplexing this and supplying an output to a transmission port.

Preferably the FDM multiplexer is connectable to receive an output from one or more multi carrier modulators and multiplex said output with the filter output.

BRIEF DESCRIPTION OF THE DRAWINGS

For a better understanding of the present invention, and to show how the same may be carried into effect, reference will now be made, by way of example, to the accompanying single figure drawing in which FIG. 1 is a block diagram of the circuit in a multi purpose digital signal regenerative processing apparatus according to a first embodiment of the present invention.

DETAILED DESCRIPTION OF THE PRESENTLY PREFERRED EXEMPLARY EMBODIMENTS

A multi-purpose digital signal regenerative processing apparatus as generally referenced 1 in FIG. 1 of the accompanying drawing, is intended for use where several data users may wish to access a common frequency resource. Different groups of users may wish to use their share of the frequency resource, that is the frequency band, with a particular modulation and access format. The apparatus of the present invention allows the frequency resource to be divided into sub-bands with the access modes and modulation formats employed for each sub-band being selectable independently of each other. To this end the apparatus 1 has three modulation sub-systems in parallel, each selectively selectable to enable a plurality of users to access independently of one another, a sub-band of a frequency band in individually selectable access modes and modulation formats.

The first modulation sub-system 2 is configured for access and operation in TDM (Time Division Multiplex) format. The second modulation sub-system 3 is configured for access and operation in FDM (Frequency Division Multiplex) or OFDM (Orthogonal Frequency Division Multiplex) format. The third modulation sub-system 4 is configured for access and operation in CDM (Code Division Multiplex) format.

In this way for each sub-band there is a choice of access modes or schemes between FDMA (Frequency Division Multiple Access), retain CDMA (Code Division Multiplex Access), asynchronous CDMA, TDMA (Time Division Multiple Access) and OFDM (Orthogonal Frequency Division Multiple Access) and any modulation format employing mapping of data into orthogonal carrier space either synchronously timed or offset. Additional to user group specification of modulation and access format several of the modulation parameters may be specifically selectable by the user group.

The apparatus of the present invention is particularly suitable for use in a satellite where capacity of the frequency band is leased to a number of separate user groups. In conventional systems individual users in the user group may either be only multiplexed at data level or require uplinking in a different modulation/access format to the uplink which requires regeneration of the uplink data on the satellite. On the contrary with the apparatus of the present invention feeder link data may be routed via the apparatus of the present invention for downlink data modulation and access mode to be applied for the downlink sub-band used by the user group.

As previously pointed out existing conventional regenerative satellite systems can operate with multiple user groups only by using dedicated modulation formats and access modes for each sub-band. With this conventional system the number of different user groups must be known unless several dedicated regenerative processors are used on each sub-band. With the present invention a single multipurpose digital signal regenerative processing apparatus can be used which can be configured for any allowed modulation format and access mode. Thus such a single apparatus can be used to replace several dedicated processors or offer greater flexibility to user groups where only one processor/group is feasible. With the apparatus of the present invention this flexibility is achieved by means of an architecture which exploits common features of the allowed access modes and enables sub-systems within the architecture to be reused for the various access modes.

To this end the apparatus of FIG. 1 has an input from a data port 5 in the form of a parallel data bus 6. It includes a plurality of differential encoders 7, each having an input connectable to an associated data line in the parallel data bus 6. The number of differential encoders 7 is equivalent to the number of data lines and the number of data lines is equivalent to the number of users, with one data line being associated with each user. The differential encoders may be disabled on command. The output of the differential encoder 7 is applied to a bank of offset modulators 8. In the offset modulators two data streams are modulated onto quadrature carriers with arbitrary difference in clock phase between the data streams. Thus the modulators 8 are operable to map a data stream received from the associated differential encoder 7 into symbols in quadrature modulation space, apply arbitrary time shift to the quadrature modulation axes, and generate a complex digital output signal. Such mapping is programmable on command for the apparatus.

The output from the offset modulators 8 is a digital bus with each signal of the digital bus consisting of a user modulated signal represented as a complex digital signal. For CDM (Code Division Multiplex) the digital signal will be a logical signal. The modulation bus is applied to the three separate modulation sub-systems 2, 3 or 4 which are in parallel. The first modulation sub-systems 2 will be active if TDM is selected for the group of users under consideration. The first sub-system 2 includes a first switch 9 whose input side is connected via a digital bus 10 to the modulators 8, a TDM multiplexer 11 connected to the output side of the first switch 9 and a second switch 12 connected to the output side of the TDM multiplexer 11.

The second modulation sub-system 3 includes a FFT (Fast Fourier Transform) device 13 whose input side is connected via a digital bus 10a to the modulators 8 and which is operable to transform digital signals received from individual modulators 8 into an FDM multiplex group signal. Thus the digital samples from the individual modulators are transformed into a group of samples representing the FDM multiplex. The individual signals in the FDM multiplex are unfiltered at this stage and are therefore passed to an FDM (Frequency Division Multiple) channel filter 14 operable to receive and filter the FDM multiplex group signals and provide an output to the first switch 9 compatible with the output received by the first switch 9 from the first modulation sub-system 2.

The FDM channel filter 14 is programmable to allow the bandwidth occupancy of the channels of the second modulation sub-system 3 to be selectable and the first switch 9 is selectively operable to connect the second modulation sub-system 3 to the TDM multiplexer 11 of the first modulation sub-system 2. Thus the TDM multiplexer 11 is reused for FDM and OFDM formats. These formats access the multiplexer 11 via the switch 9 and second sub-system 3. The application of the filter 14 at the output of the Fast Fourier Transform process effectively filters each of the original modulating signals. Thus the spectral shape of each FDM carrier is modified by the filter 14. The filter 14 preferably is a programmable design allowing the bandwidth occupancy of the FDM system to be selectable. The filter 14 may be programmed as transparent so that OFDM (Orthogonal Frequency Division Multiplex) can be assembled as a degenerate case of general FDM. The output of the second modulation sub-system 3 is a series of time samples compatible with the format of the first modulation sub-system 2.

Whether TDM, FDM or OFDM is selected, the time sequence of samples on the digital bus are applied to the TDM multiplexer 11, which sequences the time samples in order. The output of the multiplexer 11 is applied to the second switch 12 which can be set in favour of the TDM sequence or in favour of the third modulation sub-system 4.

This third modulation sub-system 4 includes a bank of XOR (Exclusive OR Function) gates 15 for receiving from the modulators 8 via the digital bus 10b and spreading a modulated signal. This third modulation sub-system 4 is used for CDM signals which may be either synchronous or asynchronous. The modulated signal is applied to the gates 15, the other gate of which has a spreading code applied thereto by code means 16. The codes may be synchronous or asynchronous and are programmable independently and separately for each user.

The output from the gates 15 is a bus containing sequential samples of the individual spread signals which are multiplexed together and converted into complex multi level digital signals by means of a PISO (Parallel In-Serial Out) digital storage device 17 and a counter 18. The multiplexed output from the counter 18 is a digital time sequence of form compatible to the output of the multiplexer 11 and is fed in parallel to the output from the multiplexer 11 to the input of the second switch 12. This second switch 12 is selectively operable to connect the third modulation sub-system 4, first modulation sub-system 2 or combined first and second modulation sub-systems to the output side thereof.

The apparatus of the present invention also includes a TDMA/CDMA (Time Division Multiple Access/Code Division Multiple Access) filter 19 for receiving the sequence of time sample signals from the output side of the second switch 12. Thus the sequences of time signals for all access modes are applied to the filter 19 which acts as a sub-band filter isolating the sub-bands from each other. In the case of the first modulation sub-system 2 being utilised in a TDM access mode the filter 19 also acts as a modulation pulse shaping filter with the shape of the filter being programmable for each user. The output from the filter 19 is fed to an FDM multiplexer 20 for multiplexing therein with the outputs of one or more multicarrier modulators inputted at 21. The output from the multiplexer 20 is fed to the output or transmission port 22.

The apparatus of the invention involves signal processing at different rates such as input bit rate, output sample rate and code rate. The relationship between these rates and any intermediate clock rates may be programmable in the apparatus adding to the flexibility. To this end the code spreading means 16 is connected via a chip clock line 22 to a clock generator 23 which in turn is in connection with a multiplex clock line 24 and a bit clock line 25. The apparatus may thus be slave clocked from the input or act as master clock to the input.

I claim:

1. A multi purpose digital signal regenerative processing apparatus, comprising:
   three modulation sub-systems in parallel, each selectively selectable to enable a plurality of users to access, independently of one another, a sub-band of a frequency band in individually selectable access modes and modulation formats, a first of which modulation sub-systems is configured for access and operation in TDM (Time Division Multiplex) format, a second of which modulation sub-systems is configured for access and operation in FDM (Frequency Division Multiplex) or OFDM (Orthogonal Frequency Division Multiplex) format, and a third of which modulation sub-systems is configured for access and operation in CDM (Code Division Multiplex) format.

2. Apparatus according to claim 1, further comprising:
   a plurality of differential encoders each having an input connectable to an associated data line in a parallel data bus, with the number of said differential encoders being equivalent to the number of data lines and with the number of data lines being equivalent to the number of users, one data line being associated with each user; and
   a plurality of offset modulators, each connected to the output of the associated differential encoder and operable to map a data stream received from the associated differential encoder into symbols in quadrature modulation space, apply an arbitrary time shift to the quadrature modulation axes, and generate a complex digital output signal.

3. Apparatus according to claim 2, wherein the first modulation sub-system includes a first switch whose input side is connected by a digital bus to the modulators, a TDM multiplexer connected to the output side of the first switch and a second switch connected to the output side of the TDM multiplexer.

4. Apparatus according to claim 3, wherein the second modulation sub-system includes an FFT (Fast Fourier Transform) device whose input side is connected via the digital bus to the modulators and which is operable to transform digital signals received from individual modulators into an FDM multiplex group signal, and an FDM channel filter operable to receive and filter the FDM multiplex group signals and provide an output to the first switch compatible with the output received by the first switch from the first modulation sub-system, which FDM channel filter is programmable to allow the bandwidth occupancy of channels of the second modulation sub-system to be selectable and which first switch is selectively operable to connect the second modulation sub-system to the TDM multiplexer of the first modulation sub-system.

5. Apparatus according to claim 4, wherein the third modulation sub-system includes a bank of XOR (Exclusive OR Function) gates for receiving from the modulators via the digital bus and spreading a modulated signal, a PISO (Parallel In-Serial Out) digital storage device and a counter operable together to receive spread signals from the XOR gates, multiplex them together and convert them into complex multi level digital signals for passage to the input side of the second switch which is selectively operable to connect the third modulation sub-system, first modulation sub-system or combined first and second modulation sub-systems to the output side thereof.

6. Apparatus according to claim 5, wherein the third modulation sub-system includes means for applying a spreading code to one gate of the bank of XOR gates, which codes are programmable separately for each user.

7. Apparatus according to claim 5, further comprising:
   a TDMA/CDMA (Time Division Multiple Access/Code Division Multiple Access) filter for receiving a sequence of time sampled signals from the output side of the second switch and isolating the sub-bands from each other, which filter is selectively programmable in shape for use with the first modulation sub-system; and
   an FDM multiplexer for receiving the output from the filter, multiplexing this and supplying an output to a transmission port.

8. Apparatus according to claim 7, further comprising at least one multi carrier modulator, wherein an output from the at least one multi carrier modulator is provided to the FDM multiplexer, wherein the FDM multiplexer multiplexes the output of the at least one multi carrier modulator with the filter output.

* * * * *